United States Patent [19]

Ansen et al.

[11] 4,270,466
[45] Jun. 2, 1981

[54] METHOD AND APPARATUS FOR RENDERING AN IGNITABLE FUEL-OXYGEN MIXTURE INERT

[75] Inventors: Jakob Ansen; Helmut Duill, both of Cologne; Heinz Fasbender, Krefeld; Rupprecht Graf, Cologne, all of Fed. Rep. of Germany

[73] Assignee: Klöckner-Humboltd-Deutz AG, Fed. Rep. of Germany

[21] Appl. No.: 82,486

[22] Filed: Oct. 9, 1979

[30] Foreign Application Priority Data

Oct. 21, 1978 [DE] Fed. Rep. of Germany ....... 2845980

[51] Int. Cl.³ .............................................. F23N 5/24
[52] U.S. Cl. .................... 110/193; 110/232; 110/244; 110/341; 110/347
[58] Field of Search .............. 110/193, 232, 347, 244, 110/341; 431/6, 16, 29, 30, 31

[56] References Cited

U.S. PATENT DOCUMENTS 1,822,221 9/1931 Jones .................. 110/232 X

Primary Examiner—Edward G. Favors
Attorney, Agent, or Firm—Hill, Van Santen, Steadman, Chiara & Simpson

[57] ABSTRACT

Method and apparatus for operating a process in which combustible solid particles are mixed during processing with air and circulated through a plurality of stages, thereby tending to build up an oxygen enriched combustible mixture during shutdown, the invention involving adding additional fuel to the oxygen enriched combustible mixture during such shutdown in a closed burner system, burning the resulting mixture in the closed burner system, and recirculating the flue gas from such combustion back into the plurality of stages to thereby function as an inert gas to prevent accidental combustion or explosion.

12 Claims, 1 Drawing Figure

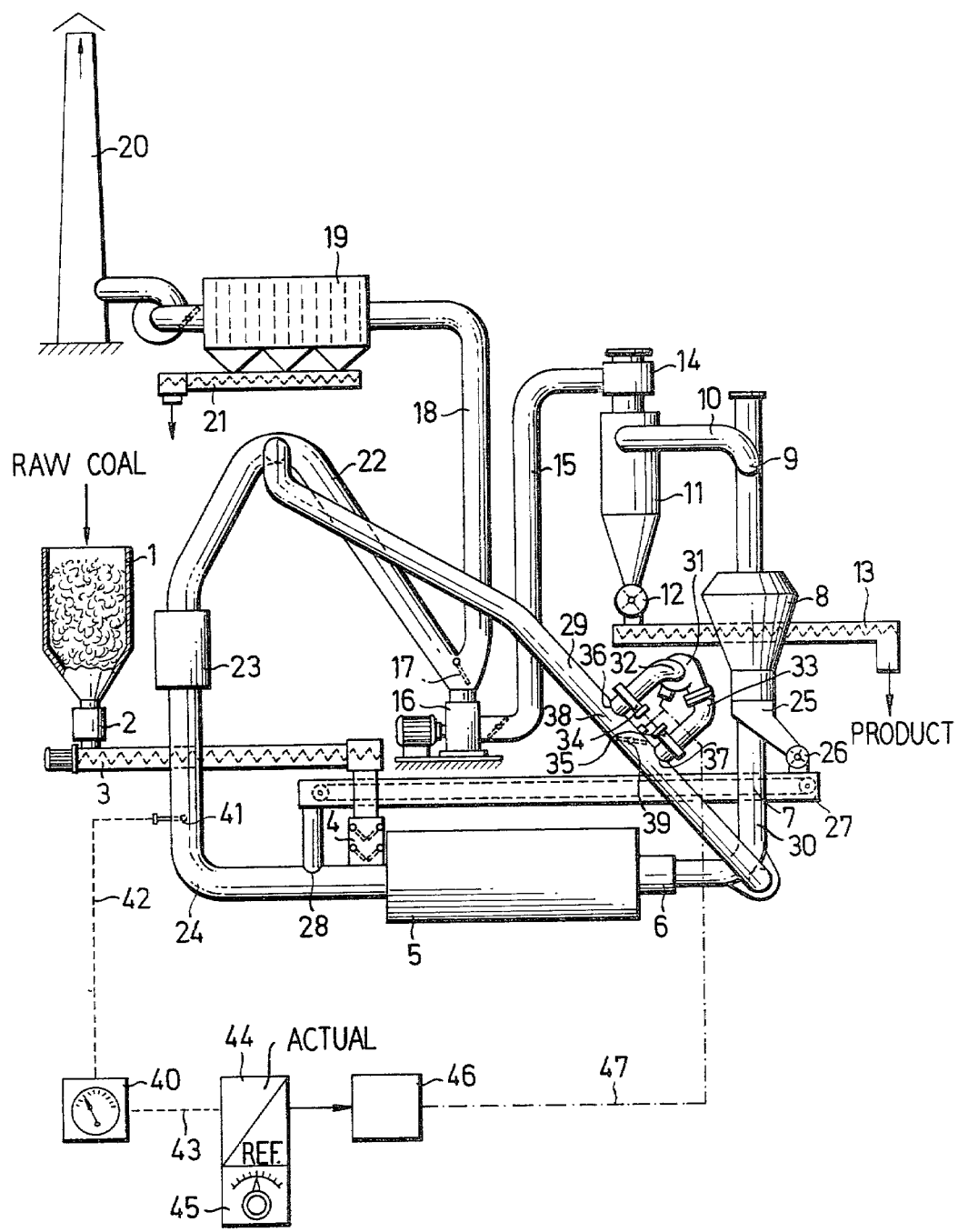

METHOD AND APPARATUS FOR RENDERING AN IGNITABLE FUEL-OXYGEN MIXTURE INERT

BACKGROUND OF THE INVENTION

1. FIELD OF THE INVENTION

This invention is in the field of processing of combustible solid particles in the presence of a combustion supporting gas, and provides a closed system for generating an inert gas during shutdown, which inert gas is circulated to the various stages of the process to provide a protective atmosphere.

2. DESCRIPTION OF THE PRIOR ART

The problem of accidental ignition of a fuel-oxygen mixture is particularly acute within grinding installations, particularly installations for grinding coal. In such installations, it has previously been proposed to fill the entire installation with inert, oxygen depleted gas when drying and grinding the combustible material. In such installations, exhaust gases may be added to the circulating air as, for example, shown in German Pat. Nos. 720,507 and 748,140.

When such an installation is shut down and cools from operating temperature to the ambient temperature, the gas in the circulatory system which contains a mixture of water vapor, volatile components of the coal, exhaust gases and air, is significantly decreased in volume due to cooling and condensation. The volume loss is replaced by aspiration of fresh air. During this shutdown, therefore, the oxygen content in the installation increases undesirably to such a degree that due, for example, to stirring up carbonization sites, detonations and fires can occur when the installation is again placed in operation.

It has further been proposed, for example, in filling hoppers, to fill the same with inert gases such as nitrogen or carbon dioxide in order to reduce the danger of detonation.

Rendering combustible mixtures within large installations inert by means of introduction of the inert gases such as nitrogen, carbon dioxide, helium, or the like, is not justifiable in many cases for reasons of economy completely apart from the fact that such use of inert gases creates a feeding and transport problem which itself can lead to considerable difficulties.

SUMMARY OF THE INVENTION

In the present invention, we make it possible to render a combustible fuel-oxygen mixture inert without substantial additions to the existing system, and without the necessity of providing separate supplies of gas which are expensive or difficult to procure. The invention makes use of the lowest possible outlay of technical devices and costs and is carried out with relatively uncomplicated means which require little or no maintenance.

In accordance with the present invention, during shutdown of the multi-stage process in which the combustible mixture is likely to be built up, at least part of the suspension of combustible particles and oxygen-containing gas is mixed with additional fuel and the mixture is burned in a separate chamber, whereupon the resultant flue gas is returned to this system for admixture with the prevailing gas, rendering the same inert.

DESCRIPTION OF THE DRAWING

The single FIGURE in the drawing is a somewhat schematic illustration of a coal grinding and drying installation making use of the improved method and apparatus of the present invention.

DESCRIPTION OF THE PREFERRED EMBODIMENTS

The present invention has the following advantages as compared with prior art systems:

(A) It is not necessary to purchase gases for rendering the system inert;

(B) The system saves costs;

(C) Rendering the circulating gas inert is independent of exhaust gas sources from another portion of the operation;

(D) The installation can be located independently of external sources of inert gas;

(E) The installation can be kept in the inert state for longer periods of time between production runs without significant outlay in terms of costs and operating materials;

(F) The apparatus can be economically implemented with commercially available devices;

(G) The outlay for switching and control elements is relatively low;

(H) Fully automatic control is possible.

In one feature of the present invention, the heat supplied to the installation and the combustion are controlled in such a manner that there is a balance with the radiation output of the installation at a predetermined temperature. Thus, a localized or extensive heating of portions of the installation is avoided. Also, by means of thermostatic temperature monitoring of one or more locations of the installation, the combustion can be controlled such that an undesired rate in temperature does not occur at any location.

Another feature of the present invention provides a connection between the air removal location and the flue gas introduction location which is closed during the combustion phase. Consequently, short-circuiting between the air removal location and the flue gas introduction is prevented in a simple manner.

In a preferred form of the invention, the flue gas is introduced at a point in the system which is vertically as low as possible. With this feature, the warm flue gas rises to the top of the installation and displaces the cold, oxygen-containing air, thereby achieving an equilibrium in a relatively short time.

The flue gas may be cooled before introduction into the installation. This is an advantage, for example, when temperature-sensitive material is being processed as by means of cooling, drying, sifting, or the like.

Another advantage of the invention is that the combustion can be interrupted during the production cycle of the system.

The present invention, while particularly applicable to grinding installations, is not limited to such installations. On the contrary, the invention can be used for all closed installation systems which are endangered by fire and/or explosion, and the operative process being carried out during the production phase is independent of the problem of rendering the environment inert, particularly in the starting phase.

The apparatus for implementing the method of the present invention provides a closed furnace system whose air intake line and flue gas output line are connected to the installation in a gas-tight manner and bridge the portion of the installation lying therebetween, and the bridged part is equipped with a cut-off valve element. This apparatus, therefore, can be made quite uncomplicated and economical while remaining functionally reliable. For example, batteries of gas bottles or gas tanks with expensive containers requiring continuous monitoring, pipelines, valves, switching elements, and the like are not required as in the case of employing a separate inert gas. Only a relatively small, commercially available burner with a relatively low output and a small fuel container as well as a few commercially available cut-off and control elements are used.

In one preferred form of the invention, a cut-off valve can be arranged both in the air intake line as well as in the flue gas line. This protects the burner from contamination during the production cycle.

It is particularly preferred that the flue gas line be located in an area of the installation which is largely free of carbonaceous or other flammable deposits. Consequently, it is preferred that the flue gas line be located in a low position of a perpendicular pipe.

The burner system used in the present invention can be used in conjunction with a hot gas generator such as employed in a grinding-drying installation. Such a hot gas generator takes primary air for the preparation of the required fuel-air mixture from the environment and not from the system, in contrast to the burner used according to the present invention. Further, such a hot gas generator is only operative after start-up of the recirculating air blower, particularly for meeting the requirements of secondary air. The blower, however, can only be placed in operation if the combustible mixtures in the installation are in a state of being inert. Therefore, the hot gas generator used in the production phase is usually not suited to supply oxygen-poor gas required for rendering the system inert beyond the production phase. The fact that the burner of the present invention can be used in such a grinding-drying system with a hot gas generator is an essential feature of the invention.

In a preferred form of the invention, there is employed a monitoring device for the control of the burner system and the function-dependent cut-off elements, such as valves. The monitoring device can be a gas monitor, a temperature monitor, or a combination of such devices.

The system of the present invention will be described in greater detail on the basis of the single embodiment schematically illustrated in the drawing. In the system illustrated, there is shown a grinding-drying installation for manufacturing coal dust. The raw coal is conveyed from a hopper 1 to an intake 4 of a grinding mill 5 by means of a metering discharge element 2 and a conveying device 3 which is closed on all sides. The conveying device 3, for example, can be a scraper conveyor, a worm conveyor or a closed vibrating conveyor tube. The intake 4 of the grinding mill 5 may take the form of a double-acting gate in the example illustrated. An uptake conduit 7 discharges into a separator 8 and is connected to a discharge opening 6 of the grinding mill 5. A discharge 9 of the separator 8 is connected to a dust separator 11 by means of a conduit 10. The separated, finished product is removed from the dust separator 11 by means of a gas-tight bucket wheel type valve 12 and a conveyor element 13 is supplied for disposition of the material. A discharge fitting 14 of the dust separator is connected to a pipeline 15 at the suction side of a ventilator 16 in which there is located a damper 17. An exhaust gas line 18 connects the ventilator 16 with a filter 19 and ultimately with a chimney 20. Refined material deposited in the filter 19 is discharged from the installation through a discharge element 21 and is added to the finished product from the conveyor 13.

A conduit 22 leading to the high pressure side of the ventilator 16 is connected to a hot gas generator 23. During operation, this hot gas generator 23 supplies the hot drying gas required for drying the material to be ground, the drying gas being introduced into the grinding mill 5 by means of a conduit 24. A grit discharge hopper 25 supplies grit from the separator 8 by means of a bucket wheel feeder 26 to a closed conveying device 27 by means of which the grit separated in the separator 8 is reintroduced into the grinding mill at a junction 28.

A siphon air line 29 leads from approximately the highest location of the recirculating air line 22 to an elbow 30 which connects the discharge 6 of the grinding mill with the uptake pipe 7. During normal operation of the grinding installation, the siphon air line 29 assures that no significant coal dust deposits can form in the area of the elbow 30.

An additional burner 31 according to the present invention is connected to the siphon air line 29 by means of a gas-tight connection. A connection conduit 32 is located on the fresh air side of the burner and a connection conduit 33 is located on the exhaust gas side. A cut-off valve 34 is disposed in the conduit 32, and conduit 33 is equipped with a cut-off valve 35. A control and cut-off damper 39 is positioned between a junction 36 of the conduit 32 and the conduit 29 and a junction 37 where the conduit 33 intersects the siphon air line 29. The control damper 39 thus is positioned between the air intake and the flue discharge lines from the burner 31.

The function of the device can be described as follows. During shut-down of the installation, an air-gas mixture containing oxygen is present in the entire system of the grinding installation, particularly in the grinding mill 5, the elbow 30 of the uptake conduit 7 on the discharge side, the separator 8, the connecting conduit 10, the separator 11, the pipe 15, the ventilator 16, as well as in conduits 18, 22 and 24 and in the hot gas generator 23. This gas mixture occurs because during the operating phase, the spaces are filled with a gas mixture consisting of water vapor, volatile components of the coal under some circumstances, exhaust gas from the hot gas generator 23, as well as air at an operating temperature slightly below 100° C. The volume of the gas mixture is significantly reduced after shut-down and cooling of the installation due to condensation and contraction and to a large extent is replaced by the introduction of fresh air.

During the operating or production phase of the installation, the valves 34 and 35 in the conduits 32 and 33 from the burner 31 are closed. The control element or valve 39 in the siphon air line 29 is at least partially open. After shutdown of the installation, the oxygen content, as described, increases in the installation. A gas monitor 40 which monitors the gas composition in the interior of the installation is connected to a probe 41 by means of a control line 42. The information derived from the probe is transmitted by means of a line 43 to a logic unit 44 which compares the reported actual value with a reference value provided by an input unit 45. The difference between the two values, whether positive or negative, is sent to a computer 46 which provides a pulse transmitting a command for opening the cut-off valves 34 and 35 by means of a control line 47 and, simultaneously, places the burner 31 in operation. Simultaneously, the cut-off and control damper 39 in the pipe section 38 of the siphon air line 29 is closed.

After the burner 31 is placed in operation, the oxygen-containing gas from the siphon air line 29 is mixed with additional fuel, and the mixture is burned to emit flue gas to the conduit 31 and specifically to the portion of the siphon air line 29 which is directed downwardly. By means of the siphon air line 29 and the elbow 30, the hot flue gas is directed into the uptake conduit 7 and subsequently into the separator 8 and fills these conduits and components with flue gas which effectively reduces the oxygen concentration in the gas and increases the carbon dioxide component. Finally, the inert gas also fills the hot gas generator 23, the connection conduit 24, and the grinding mill 5 as well as the filter 19 until the gas environment for the entire installation has been rendered inert.

The combustion conditions are controlled so that the velocity of the gases in the stages is kept below that which would produce sweeping and suspension of any deposited combustible material therein. Normally, this means a gas velocity of from 1 to 5 m/sec., and preferably from 2 to 3 m/sec.

Subsequently, the gas monitor 40 gives a command for shutting off the burner 31 and for closing the cut-off valves 34 and 35 as well as for opening the control damper 39. This occurs by the operation of the switching element 46 and the logic unit 44.

A temperature monitoring element can also be added to the electronic monitoring installation consisting of a probe 41, gas monitor 40, control line 43, logic circuit 45, input unit 45, computer 46 and control line 47. Such a thermostatic device can be included in the control circuit within the discretion of the average technician and is not illustrated specifically.

The embodiment of the invention in the environment of a coal dust grinding installation is only one possible example of its use. The invention may also be employed, for example, in flour mills and other milling installations in addition to those for the grinding of coal. Furthermore, the invention is not limited to grinding or milling installations but is fundamentally capable of being employed in all installations which are subject to fire and/or explosion, for example, in systems for sifting, drying, grinding-drying, filtering, or for the implementation of other processes. Such variations and embodiments are part of the present invention, insofar as they are covered by one or more of the patent claims.

We claim as our invention:

1. In a method of operating a process in which combustible solid particles mixed with air are circulated through a plurality of stages during processing and tend to build up an oxygen-enriched combustible mixture during shut-down, the improvement which comprises:
   adding additional fuel to said oxygen-enriched combustible mixture during such shut-down,
   burning the resulting mixture in a combustion zone separate from said plurality of stages, and
   introducing the flue gas from said combustion zone back into said plurality of stages to thereby provide an inert gas therein.

2. A method according to claim 1 which includes the step of:
   controlling the velocity of gases in said plurality of stages below that which would produce sweeping and suspension of any deposited combustible material therein.

3. A method according to claim 2 in which said velocity is in the range of 1 to 5 m/sec.

4. A method according to claim 2 in which said velocity is in the range of 2 to 3 m/sec.

5. A method according to claim 1 in which:
   said flue gas is introduced into said plurality of stages at a low point thereof.

6. A method according to claim 1 in which:
   said flue gas is cooled before its introduction into said plurality of stages.

7. A method according to claim 1 in which:
   said burning is terminated during processing of said particles in said plurality of stages.

8. A method according to claim 1 in which:
   said plurality of stages includes a grinding stage and a stage for generating hot drying gases.

9. An apparatus for processing finely divided combustible material including:
   a plurality of stages through which said combustible material is passed in admixture with an oxygen-containing gas,
   a closed burner system including an air intake line and an exhaust gas line, and
   means for selectively introducing a suspension of finely divided combustible material and air into said closed burner system and for injecting flue gas from said closed burner system back into said stages.

10. An apparatus according to claim 9 in which:
    said closed burner system is located in an area substantially free of combustible deposits.

11. An apparatus according to claim 9 in which:
    said plurality of stages includes a grinding stage and a stage for generating hot drying gases.

12. An apparatus according to claim 9 which includes:
    an automatic monitoring device for commencing and terminating operation of said closed burner system.

* * * * *